United States Patent Office 2,943,916
Patented July 5, 1960

2,943,916
PREPARATION OF BORON TRICHLORIDE

Albert D. McElroy, Mars, Pa., assignor to Callery Chemical Company, Pittsburgh, Pa., a corporation of Pennsylvania No Drawing. Filed Dec. 20, 1957, Ser. No. 703,990
5 Claims. (Cl. 23—205)

This invention relates to a new process for the preparation of boron trichloride and more particularly to its preparation from trimethyl borate or trimethoxyboroxine and chlorine.

The boron halides are trivalent compounds of boron with a halogen. They have varied uses, for example as intermediates in many reactions, such as Grignard reactions to produce other boron compounds, and as catalysts. Since the boron halides are among the basic boron compounds, methods of preparing them have been the subject of considerable investigation.

For example, United States Patent 2,097,482 to Weber and Guyer describes a method of preparing boron trichloride by passing chlorine over a mixture of boron oxide and carbon at 1000° to 1200° C. However, this as well as the other known methods for preparing boron trichloride are all subject to certain disadvantages; for example, in most cases very high temperatures are required to induce reaction.

An object of this invention is to provide a simple and easily practiced method for preparing boron trichloride at ordinary temperatures.

A further object is to provide a method for preparing boron trichloride by the reaction of trimethyl borate or trimethoxyboroxine with chlorine.

Other objects will become apparent from the following specification and claims.

This invention is based on the discovery that trimethyl borate will react with chlorine to produce boron trichloride according to the equation:

(1) $B(OCH_3)_3 + 9Cl_2 \rightarrow BCl_3 + 3COCl_2 + 9HCl$

The reaction takes place easily at room temperature by simply allowing the reactants to come in contact with one another. When stoichiometric or excess amounts of chlorine are used, i.e. at least a 9 to 1 mole ratio of chlorine to methyl borate, the reaction proceeds quantitatively according to the above equation. If, however, a less than stoichiometric amount of chlorine is used, the yield of the boron trichloride is reduced and chloromethyl ether and carbon monoxide are also produced.

In one experiment illustrating the method of the invention, 1.45 millimoles of trimethyl borate were dried over sodium and distilled into an evacuated glass reaction tube. 15.2 millimoles of chlorine, an 11% excess according to the above equation, were then condensed into the tube. After the tube was sealed, the reactants were allowed to warm to room temperature. In 2 hours the yellow color of the chlorine had almost disappeared, indicating the reaction had taken place. The tube was attached to a vacuum system and opened. The products were separated by fractional condensation and analyzed by infra-red and mass spectrometer techniques. 1.4 millimoles of boron trichloride, $BCl_3$, were found along with 5.2 millimoles of phosgene and 14.6 millimoles of hydrogen chloride. These results agree very closely to those expected from Equation 1 and represent a 96% yield of $BCl_3$.

In another, similar, experiment using 2.48 millimoles of $B(OCH_3)_3$ and 7.93 millimoles of chlorine (approximately 1 to 3 mole ratio), the products of the reaction included, in addition to those obtained above, chloromethyl ether and carbon monoxide.

The invention may also be practiced using trimethoxyboroxine in place of trimethyl borate. Trimethoxyboroxine as referred to herein means the products obtained from the reaction of boric oxide and trimethyl borate in varying ratios. These products may be represented for convenience by the formula $B_3O_3(OCH_3)_3$. It is to be understood, however, that an excess of either boric oxide or trimethyl borate may be present, in which cases this formula may not indicate the exact composition of the material. The reaction when using these materials appears to proceed according to the equation:

(2) $B_3O_3(OCH_3)_3 + 9Cl_2 \rightarrow$
$BCl_3 + 3COCl_2 + 9HCl + B_2O_3$

As indicated by the equation, the trimethoxyboroxine serves as a source of trimethyl borate and the reaction takes place in the same manner as when trimethyl borate is used.

In one exemplification of this embodiment of the invention, conducted in the manner described above, 1.4 millimoles of trimethoxyboroxine were placed in a glass reaction tube together with an excess of chlorine. After 24 hours at room temperature, the tube was opened and the volatile products analyzed. 1.45 millimoles of boron trichloride were obtained, indicating a quantitative reaction according to Equation 2. A white non-volatile residue of $B_2O_3$ remained in the tube.

The products of the reaction are obtained as a mixture of gases, which must be separated in order to recover the pure boron trichloride. This separation may be accomplished by careful use of any of several conventional means, such as fractional condensation, low-temperature distillation, selective adsorption etc.

Boron trichloride is hydrolyzed by moisture and thus it is desirable to keep the reaction system as nearly free of water as possible. For this reason, anhydrous reactants are preferred as starting materials. However, small amounts of moisture merely reduce the yield of boron trichloride obtained and do not render the process inoperative. Similarly, although dry air will not affect the reaction, it is desirable to exclude ordinary, moisture-laden air from the reaction system.

Since the reaction takes place readily at room temperature, i.e. about 25° C., elevated temperatures are not necessary. However, higher temperatures may be used if desired, as, for example, to induce a faster rate of reaction.

According to the provisions of the patent statutes, I have explained the principle and mode of operation of my invention and what I now consider to be its best embodiments. However, I wish to have it understood that within the scope of the appended claims, the invention may be practiced otherwise than as specifically described.

I claim:

1. A method of preparing boron trichloride which comprises contacting a compound selected from the group consisting of trimethyl borate and trimethoxyboroxine with chlorine, and recovering the boron trichloride formed.

2. A method according to claim 1 in which the reactants are contacted at a temperature of about 25° C.

3. A method according to claim 1 in which the mole ratio of chlorine to said compound is at least 9 to 1.

4. A method according to claim 1 in which the reactants are substantially anhydrous.

5. A method of preparing boron trichloride which comprises contacting anhydrous trimethyl borate with anhydrous chlorine in a ratio of at least 9 moles of chlorine per mole of trimethyl borate, and recovering the boron trichloride formed.

References Cited in the file of this patent

Chemical Reviews, October 1956, vol. 56, No. 5, p. 973.